US008059766B2

(12) United States Patent
Furman et al.

(10) Patent No.: US 8,059,766 B2
(45) Date of Patent: *Nov. 15, 2011

(54) COMMUNICATIONS DEVICE AND RELATED METHOD WITH REDUCED FALSE DETECTS DURING START OF MESSAGE BIT CORRELATION

(75) Inventors: William N. Furman, Fairport, NY (US);
John W. Nieto, Rochester, NY (US);
William L. Tyler, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 771 days.

This patent is subject to a terminal disclaimer.

(21) Appl. No.: 11/954,285

(22) Filed: Dec. 12, 2007

(65) Prior Publication Data
US 2009/0154602 A1    Jun. 18, 2009

(51) Int. Cl.
*H04L 27/06* (2006.01)
(52) U.S. Cl. ........ 375/344; 375/238; 375/239; 375/242; 375/256; 375/353; 455/130; 329/311; 329/304
(58) Field of Classification Search .................. 375/344, 375/354, 362, 368, 371, 375
See application file for complete search history.

(56) References Cited

U.S. PATENT DOCUMENTS

| 5,315,562 | A  | * | 5/1994 | Bradley et al. | ................... | 367/89 |
| 5,903,654 | A  |   | 5/1999 | Milton et al. | ................... | 380/49 |
| 6,529,566 | B1 |   | 3/2003 | Carsello et al. | ............... | 375/340 |
| 6,560,303 | B1 | * | 5/2003 | Fan et al. | ....................... | 375/365 |
| 6,781,446 | B2 |   | 8/2004 | Furman et al. | ................ | 329/304 |
| 7,620,125 | B1 | * | 11/2009 | Chang et al. | ................... | 375/326 |
| 7,916,799 | B2 | * | 3/2011 | Brink et al. | .................... | 375/260 |
| 2004/0218703 | A1 | * | 11/2004 | Kruger et al. | ................. | 375/350 |
| 2006/0093076 | A1 | * | 5/2006 | Lee et al. | ...................... | 375/343 |
| 2007/0140212 | A1 | * | 6/2007 | Gaikwad et al. | .............. | 370/350 |
| 2007/0147225 | A1 | * | 6/2007 | Yu et al. | ......................... | 370/203 |
| 2007/0195914 | A1 | * | 8/2007 | Chang et al. | .................. | 375/343 |
| 2007/0280098 | A1 | * | 12/2007 | Bhatt et al. | .................... | 370/208 |
| 2008/0043886 | A1 | * | 2/2008 | Inagawa et al. | ............... | 375/343 |
| 2008/0137768 | A1 | * | 6/2008 | Park et al. | ..................... | 375/267 |

* cited by examiner

Primary Examiner — Shuwang Liu
Assistant Examiner — Gina McKie
(74) Attorney, Agent, or Firm — Allen, Dyer, Doppelt, Milbrath & Gilchrist, P.A.

(57) ABSTRACT

A communications device includes a signal input for receiving signals such as a binary phase shift keyed (BPSK) communications signal having a repeated preamble bit or symbol pattern. A modem processes the communications signal and includes a demodulator and processor that generates an initial frequency offset estimate and phase error estimate by processing a Fast Fourier Transform (FFT) that detects the repeated preamble pattern for a block of samples within the communications signal, correlates within a start of message correlator to search for a start of message sequence and correlates different phases of the repeated preamble pattern within training correlators for reducing false detections of the start of message. Radio circuitry is operative with the modem for processing communications data obtained from the communications signal.

24 Claims, 12 Drawing Sheets

COMMUNICATIONS DEVICE AND RELATED METHOD WITH REDUCED FALSE DETECTS DURING START OF MESSAGE BIT CORRELATION

FIELD OF THE INVENTION

The present invention relates to communications devices, and more particularly, the present invention relates to communications devices that improve acquisition estimates of frequency offset and phase error.

BACKGROUND OF THE INVENTION

Some multi-band or other tactical radios operate in the high frequency (HF), very high frequency (VHF), and ultra high frequency (UHF) bands. The frequency range of these multi-band tactical radios is from about 2 MHz to about 512 MHz. Next generation radios will probably cover about 2.0 to about 2,000 MHz (2.0 GHz)(or higher) to accommodate wider bandwidths, higher data rates and less crowded frequency bands. Several standards have been developed for the different frequency bands. For HF, US-MIL-STD-188-110B and US-MIL-STD-188-141B specify waveforms and minimum performance requirements of waveforms and radio equipment, the disclosures which are incorporated by reference in their entirety.

UHF standards, on the other hand, provide different challenges over the 225 to about 512 MHz frequency range, including short-haul line-of-sight (LOS) communication and satellite communications (SATCOM) and cable. UHF waveforms operate through different weather conditions, foliage and other obstacles making UHF SATCOM an indispensable communications medium for many agencies. Different directional antennas can be used to improve antenna gain and improve data rates on the transmit and receive links. This type of communication is typically governed in one example by MIL-STD-188-181B, the disclosure which is incorporated by reference in its entirety. This standard specifies a family of constant and non-constant amplitude waveforms for use over satellite links.

The joint tactical radio system (JTRS) implements some of these standards and has different designs that use oscillators, mixers, switchers, splitters, combiners and power amplifier devices to cover different frequency ranges. The modulation schemes used for these types of systems can occupy a fixed bandwidth channel at a fixed carrier frequency or can be frequency-hopped.

These systems use many different types of modulations, including M-ary phase-shift keying (M-PSK) modulation, M-ary quadrature-amplitude modulation (M-QAM) or modulations with memory, such as continuous phase modulation (CPM), and are sometimes combined with convolutional or other type of forward error correction codes. To ensure interoperability, standardized waveforms are often used. These and other systems often use a Binary Phase Shift Keyed (BPSK) waveform for Demand Assigned Multiple Access (DAMA) communications systems. Some examples are the 117F and F3 manpack radios manufactured by Harris Corporation of Melbourne, Fla. Several performance issues were noted in some of these and similar radios as caused by "bad" acquisitions. The receiver modem must acquire the waveform in each DAMA slot such as corresponding to a time division multiple access (TDMA) slot. If acquisition estimates have excessive error, data is lost for the entire slot.

This type of modem often uses a Fast Fourier Transform (FFT) to detect the waveform and exploit spectral characteristics of a transmitted preamble. After the modem processes the FFT and detects the preamble, the modem estimates the frequency offset and the phase from complex FFT output values. It is desirable to improve acquisition estimates of the frequency offset, phase error and symbol timing to allow better processing and acquisition estimates and enhance communications.

Also, because of the non-random aspect of the preamble, the start of message bit correlation can sometimes false alarm during this non-random preamble portion of the waveform, i.e., the 110110110110 portion of the preamble, for example, forming the training sequence. It would be advantageous if false detections could be reduced in this portion of the preamble prior to the start of message bits.

SUMMARY OF THE INVENTION

A communications device includes a signal input for receiving a digitally modulated communications signal such as binary phase shift keyed (BPSK) communications signal having a repeated preamble bit or symbol pattern. A modem processes the communications signal and includes a demodulator and processor that generates an initial frequency offset estimate and phase error estimate by detecting the repeated preamble pattern for a block of samples within the communications signal, correlates within a Start of Message correlator to search for a Start of Message bit or symbol sequence and correlates different phases of the repeated preamble pattern within training correlators for reducing false detections of the start of message. Radio circuitry is operative with the modem for processing communications data obtained from the communications signal.

The modem is operative for correlating within N training correlators for N different phases of a M bit pattern. It is operative for determining a good acquisition has occurred when the output from the start of message correlator is larger than any of the training correlators. The block of samples can span 256 samples with 64 BPSK symbols sampled at four samples per symbol.

It is possible to correlate two halves of the block of samples with a plurality of different shifted sequences and determine a maximum correlation value based on the shifted sequence that provides the maximum correlation value to establish a symbol timing estimate based on the known timing alignment of the shifted sequence providing the maximum correlation value. The modem can rotate the block of samples by the negative of the initial frequency offset estimate.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
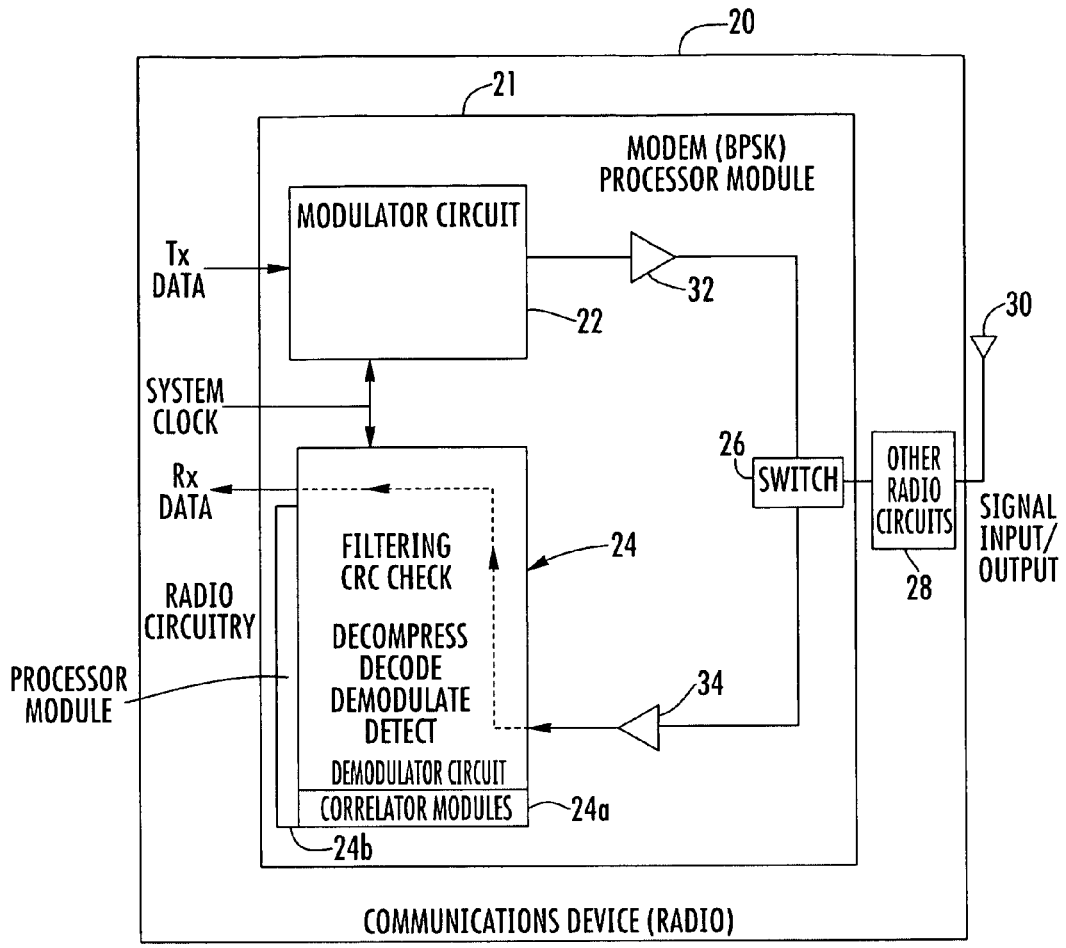
FIG. 1 is a block diagram of a transceiver modem that can be used in accordance with a non-limiting example of the present invention for improving estimates of frequency offset, phase error and symbol timing and better detecting the start of message sequence.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

It should be appreciated by one skilled in the art that the approach to be described is not limited for use with any particular communication standard (wireless or otherwise) and can be adapted for use with numerous wireless (or wired) communications standards such as Enhanced Data rates for GSM Evolution (EDGE), General Packet Radio Service (GPRS) or Enhanced GPRS (EGPRS), extended data rate Bluetooth, Wideband Code Division Multiple Access (WCDMA), Wireless LAN (WLAN), Ultra Wideband (UWB), coaxial cable, radar, optical, etc. Further, the invention is not limited for use with a specific PHY or radio type but is applicable to other compatible technologies as well.

Throughout this description, the term communications device is defined as any apparatus or mechanism adapted to transmit, receive or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof. Wireless communication involves: radio frequency communication; microwave communication, for example long-range line-of-sight via highly directional antennas, or short-range communication; and/or infrared (IR) short-range communication. Applications may involve point-to-point communication, point-to-multipoint communication, broadcasting, cellular networks and other wireless networks.

As will be appreciated by those skilled in the art, a method, data processing system, or computer program product can embody different examples in accordance with a non-limiting example of the present invention. Accordingly, these portions may take the form of an entirely hardware embodiment, an entirely software embodiment, or an embodiment combining software and hardware aspects. Furthermore, portions may be a computer program product on a computer-usable storage medium having computer readable program code on the medium. Any suitable computer readable medium may be utilized including, but not limited to, static and dynamic storage devices, hard disks, optical storage devices, and magnetic storage devices.

The description as presented below can apply with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

The communications system and device and related method, in accordance with a non-limiting example of the present invention, involves an iterative approach to refine frequency offset and phase error estimates and provides a highly accurate symbol timing estimate.

Some current modems for communications systems and devices, especially those processing a BPSK waveform, have implemented an approach that uses the FFT to detect the waveform by exploiting the spectral characteristics of the transmitted preamble. After the FFT detects the preamble, the modem estimates the frequency offset and phase error from complex FFT output values. Note that other techniques (such as sliding block correlators using a single reference sequence rotated by various frequency offset hypothesis, where block size is equal to FFT size) can be used instead of FFT approach but may be more computational intensive to implement.

An initial transmission typically has a repeated pattern such as 011, followed by a unique start of message (SOM) sequence. The FFT based processing in the modem detects the repeated pattern of the 011 sequence and generates an initial frequency offset and phase error estimate. The FFT in this case spans 256 samples containing 64 BPSK symbols sampled at four samples per symbol. The system, device and method in accordance with a non-limiting example of the present invention processes this block of 256 samples and the initial frequency offset estimate in an iterative fashion to improve the acquisition estimates of frequency offset and phase error and provide a symbol timing estimate. It also better detects the start of message sequence using correlators. Note that the block size can be increased in an effort to further improve the initial acquisition processing (for example, 512 samples instead of 256).

An example of the steps that can be used, in accordance with a non-limiting example of the iterative technique, is set forth below as explained for a BPSK waveform.

Step 1: The 256 samples are rotated by the negative of the initial frequency offset estimate.

Step 2: A complex correlation is performed (in two halves, 128 samples each) with 12 different BPSK 011 training sequence alignments (4 samples per symbol) as follows:
00001111111100001111111000011111111 ...
00011111111100001111111100001111111 ...
00111111111000011111111000011111110000 ...
01111111110000111111110000111111110000 ...
11111111000011111111000011111110000 ...
11111110000111111110000111111100001111 ...
11111100001111111100001111111100001111111 ...
11111000011111111000011111111000011111111 ...
11110000111111110000111111110000111111100 ...
11100001111111100001111111100001111111000 ...
11000011111111000011111111000011111111000 ...
10000111111110000111111110000111111110000 ...

Note that each training sequence alignment will be extended to be 256 samples long to match the block size of step 1.

Step 3: The magnitude-squared of the sum of the two halves of each correlator output is calculated and the alignment giving the maximum value is selected Note that only the training sequence alignment yielding the maximum value will be used in steps 4-7.

Step 4: A frequency offset adjustment is calculated by performing the complex conjugate dot product between the first one-half complex correlator output and the second half complex correlator output.

Step 5: The frequency offset estimate is updated to the previous estimate plus the new adjustment.

Step 6: The initial 256 samples used by FFT processing are rotated by the negative of the updated frequency offset estimate.

Step 7: A complex correlation is performed (in two halves, 128 samples each) with the training sequence alignment that gave the maximum value.

Step 8: Steps 4-7 are repeated a number of times (iteratively). In one non-limiting example, three iterations occur.

Step 9: The final updated frequency estimate is obtained after the iterative process, the selected training sequence alignment accurately identifies the proper symbol alignment and the final correlation values provide the phase error estimate to give a more refined (or accurate) frequency offset and phase error.

FIG. 1 is a high-level block diagram of a communications device 20, for example, a radio, which includes, as a non-limiting example, a BPSK modem that can be used for processing a BPSK waveform for DAMA operation. In this example, demand assigned multiple access (DAMA) technology assigns a bandwidth to clients that do not require use of the bandwidth constantly. Typically, DAMA communications systems assign communications channels or circuits based on requests from user terminals to network control systems. When the circuit is not in use, channels can be returned for reuse by others. This technology is often used in satellite channels on a per request basis and increases the amount of users in a pool of channels available for use by any station in a network.

DAMA technology is often used in association with a BPSK waveform because binary phase shift keying (BPSK) is a simple and robust digital modulation technique. BPSK uses two phases that are separated by 180 degrees (thus it can also be termed 2-PSK). This type of modulation is more robust than higher-order PSK modulations (i.e. 4-PSK, 8-PSK, etc) and serious distortions would have to occur to force a demodulator to reach an incorrect decision.

It should be understood that the technique as described can be used with any type of modem that processes M-PSK, M-QAM and CPM waveforms and particularly a BPSK waveform that has known repeated data in the preamble to provide a technique for not only obtaining the symbol timing, but also improving the acquisition estimates of the frequency offset and phase error. Also, as noted before, the modem uses the FFT to detect the waveform by exploiting the spectral characteristics of a transmitted preamble.

As shown in FIG. 1, the modem 21 is incorporated as part of a transceiver modem processor for BPSK modulation and demodulation and includes a modulator 22 and demodulator 24. The modulator 22 receives data and includes all necessary processing functions with appropriate modules and circuits as required for operation. A clock signal is received from a system clock as illustrated. The demodulator 24 includes necessary functional modules or circuits, including those for a detector, demodulator, decoder, data decompressor, CRC checker, and filter as non-limiting examples of the type of circuits or modules that can be part of the modem and its processor. The modem 21 can be incorporated within a digital signal processor or field programmable gate array, including a software defined radio, or it can be part of a hard-wired transceiver or discrete modem radio circuit. The modem includes any necessary processor modules 24b. The switch 26 allows transmit and receive functions to pass through other radio circuits 28 into and from the antenna 30.

Appropriate amplifiers 32,34 can be positioned between the modulator 22, switch 26 and demodulator 24. Correlator modules 24a, as will be explained in further detail relative to FIG. 11, detect the start of message sequence in a better manner with reduced false detects, providing a technique for reducing start of message false detects. The correlators using multiple hypothesis correlation processing as a "quad correlator." Due to the non-random aspect of the preamble, the start of message bit correlation can sometimes false alarm during this non-random preamble portion of the waveform. The correlator modules can reduce the false detections in the (110110 . . . ) portion of the preamble prior to the start of message bits. Once the waveform preamble is acquired and frequency phase and timing offset computed, it is possible to start the correlator modules while searching for the start of message bits and the other plurality of correlators correlating for three different phases of the 110 pattern, as will be explained in detail below.

It should be understood that different techniques can be used for generating BPSK signals, including the use of standard lattice ring modulators or balanced modulators. Demodulation can occur using a balanced modulator, such as a diode ring or lattice modulator. These modules or circuit functions could be incorporated within appropriate DSP or FPGA circuits that include the modem. As an example, when demodulating BPSK signals, a carrier with a correct frequency and phase relationship can be applied to a balanced modulator along with the BPSK signal in an appropriate carrier recovery circuit. Some type of bandpass filter could ensure that only the desired BPSK signal is passed. This signal could be squared or multiplied by itself in a balanced modulator or analog multiplier by applying the same signal to both inputs. Squaring could remove the 180 degree phase shifts resulting in an output that is twice the input signal frequency. The signal could be passed through a bandpass filter with the resulting signal applied to the phase detector of a phase locked loop (PLL). A voltage controlled oscillator could track any carrier frequency shifts. A correct frequency and phase relationship can be obtained as the result, and the carrier is applied to the balanced modulator/demodulator along with a BPSK signal in one non-limiting example.

Figure 2:
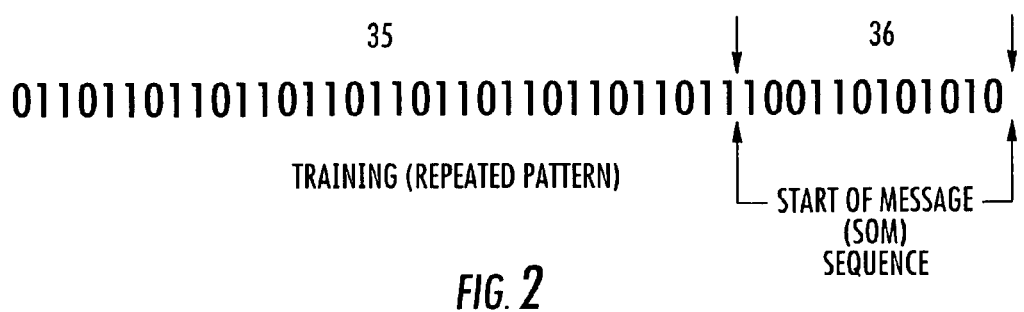
FIG. 2 shows a repeated pattern in an initial communications signal transmission and showing a start of message (SOM) sequence.

FIG. 2 shows a bit pattern for an initial transmission of a BPSK communications signal. This pattern shows the repeated pattern of 011 as a training sequence in one non-limiting example at 35, followed by a unique start of message sequence, illustrated with a portion of the bit pattern sequence at 36. The FFT based processing detects this repeated 011 bit pattern sequence as a training sequence (or preamble) and generates an initial frequency offset and phase error estimate. The FFT spans 256 samples which contain 64 BPSK symbols sampled at four samples per symbol in this non-limiting example. As noted before, the receiver modem processes this block of 256 samples and the initial frequency offset estimate in an iterative fashion to improve acquisition estimates of frequency offset and phase error. It can also obtain symbol timing in a previous portion of the technique.

Figure 3:
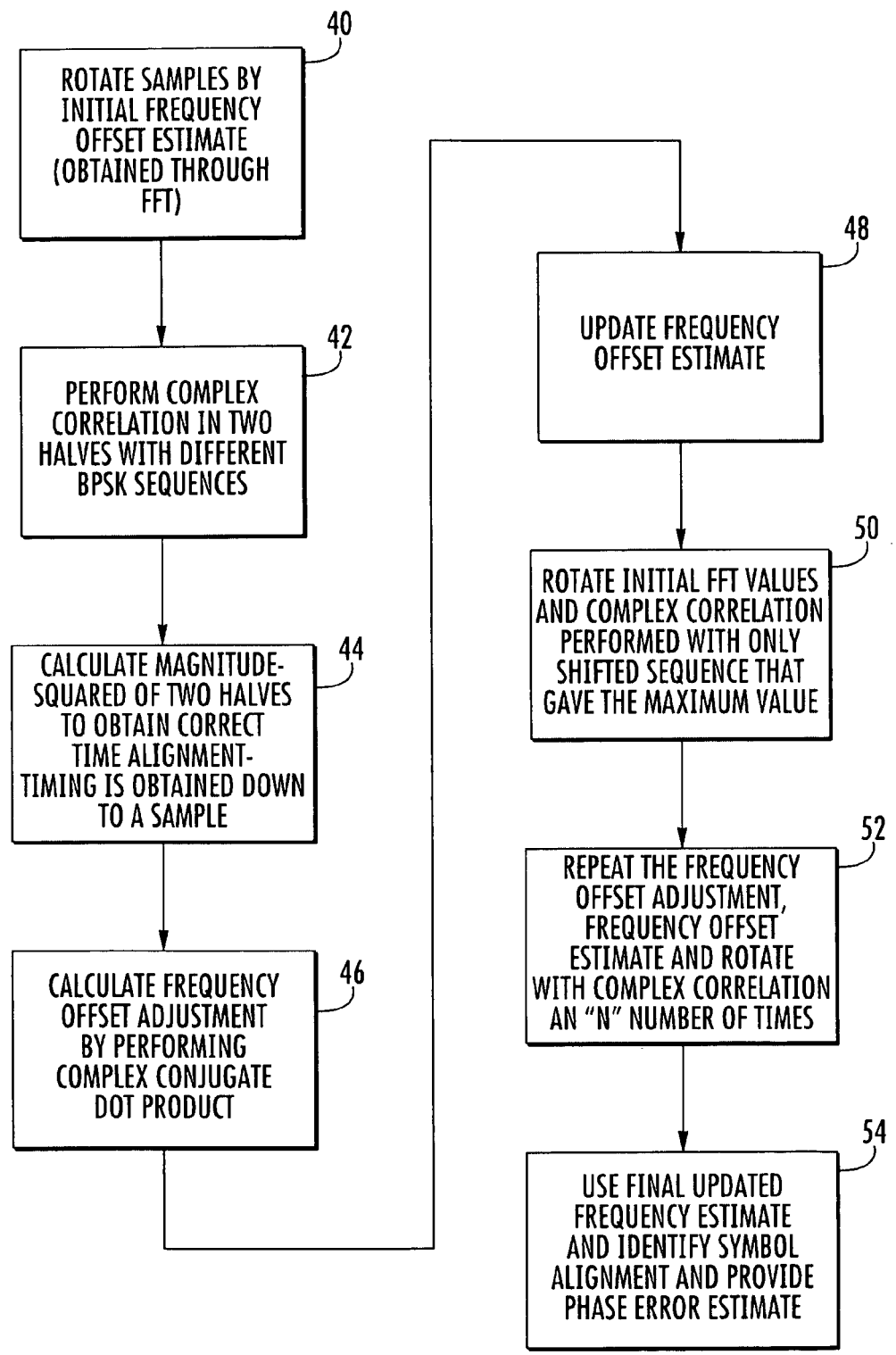
FIG. 3 is a high-level flowchart showing an example of a method used for improving acquisition estimates of frequency offset, phase error and symbol timing in accordance with a non-limiting example of the present invention.

FIG. 3 is a high-level flowchart in accordance with a non-limiting example of the present invention, The samples are rotated by the negative of the initial frequency offset estimate that is obtained through the FFT (block 40). The FFT based processing looks for the frequency components with specific spectral properties and determines when the signal is present. In the following description, the term modem is used and can apply to the modem functions of a communications device and any associated circuitry.

A complex correlation is next performed in two halves with different BPSK training sequence alignments (block 42). As noted before in the previous step-by-step description, twelve different BPSK training sequence alignments are used in this example. Any number of different BPSK sequences, however, could possibly be used, depending on end-use and device processing requirements (such as the number of samples per symbol). It should be understood that the phasing of the 011 portions in the data are initially not known. Because there are 256 samples, the bit sequence is broken into two halves, with 128 samples followed by 128 samples. These samples are correlated against a shifted and repeated 011 BPSK symbol pattern. For example, if four samples per symbol are used, the 011 BPSK symbol pattern expands to 000011111111 samples and this base pattern is repeated to generate 256 samples. To generate the second sequence, the base pattern is circularly shifted left by 1. The third pattern is the base pattern circularly shifted left by 2, the fourth pattern is the base pattern circularly shifted left by 3 and so forth. Once the twelve patterns are generated, the processor can then correlate the received 256 samples with the 12 training sequence alignment patterns, where each correlation is over 128 samples.

At this time (block 44), the sum of the magnitude squared of the two halves is calculated using the correlation outputs of each of the 12 training sequence alignment patterns. The modem receive processing looks at the 12 magnitude squared values and the largest value corresponds to the best symbol timing alignment. Thus, this technique can determine symbol timing alignment down to a sample. Prior to this step, the modem does not know where symbol boundaries begin and end.

At this time, the modem calculates the frequency offset adjustment by performing a complex conjugate dot product (block 46) between the output of the two 128 sample correlations for the sequence alignment with the largest magnitude squared value. Ideally, if the first estimate coming from the FFT was correct, this would be a 0. This often would not occur and as a result, a delta (corresponding to the change) in the frequency offset is obtained. The frequency offset estimate is updated (block 48) as based on the initial value with the new estimated value. A loop back occurs and the initial data is rotated by the negative of the new frequency offset value. The initial FFT values are rotated and a complex correlation performed with only the shifted training sequence alignment pattern that gave the largest magnitude squared value (block 50). Instead of performing the correlation for all 12 sequences, the modem performs a correlation for one sequence in which the timing alignment is known as has been determined in the previous portion of the process. The modem the first time through the process obtains the symbol timing alignment from the sequence providing the maximum value. On the subsequent rotation, the loop occurs.

The frequency offset adjustment is repeated (block 52) and the frequency offset estimate is updated with the complex correlation an "N" number of times. "N" can vary, but in one non-limiting example, is three. The final updated frequency estimate is used and the symbol alignment is identified and the phase error estimate completed (block 54). Thus, the selected correlator gives the proper symbol timing alignment and the final correlator values for the phase error estimate.

Figure 4:
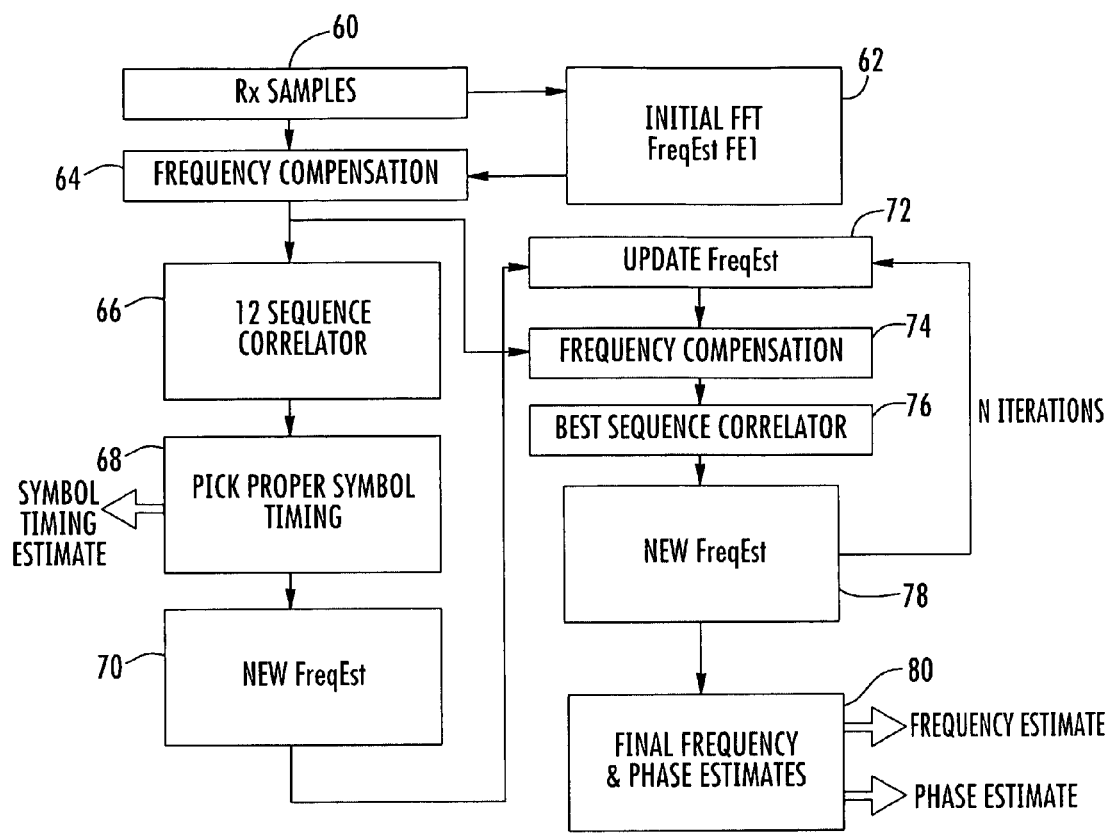
FIG. 4 is another high-level flowchart similar to the flowchart shown in FIG. 3, and showing when the symbol timing estimate is obtained relative to when the frequency and phase estimates are obtained.

FIG. 4 is another high-level flowchart showing the basic sequences of operation in accordance with a non-limiting example of the present invention. The samples are received (block 60) and the initial FFT and frequency estimate are established (block 62). The frequency compensation is determined (block 64). The twelve sequence correlations occur (block 66) and the proper symbol timing alignment is picked (block 68), resulting in the symbol timing estimate. A new frequency estimate is established (block 70). The frequency estimate is updated (block 72) and the frequency compensation, by rotating by the negative of the frequency estimate occurs (block 74). The best training sequence alignment is used for the correlation (block 76) and the new frequency estimate established (block 78). This process is repeated a plurality of times for N iterations as seen by the loop back. The final frequency and phase estimates are established (block 80). It should be understood that this technique can be used with any type of modem that sends a known sequence as a preamble (or training sequence) to improve the frequency estimate and phase estimate.

It is possible for the line drawn from the frequency compensation (block 64) to come from after the received samples at block 60 into the frequency compensation at block 74. This process and choice can depend on how the frequency estimate is maintained and the delta compensated. It is possible to establish an initial frequency estimate from the acquisition and keep updating a delta frequency estimate from that estimation. It is also possible to maintain a total frequency offset and pull the received samples every time.

Figure 5:
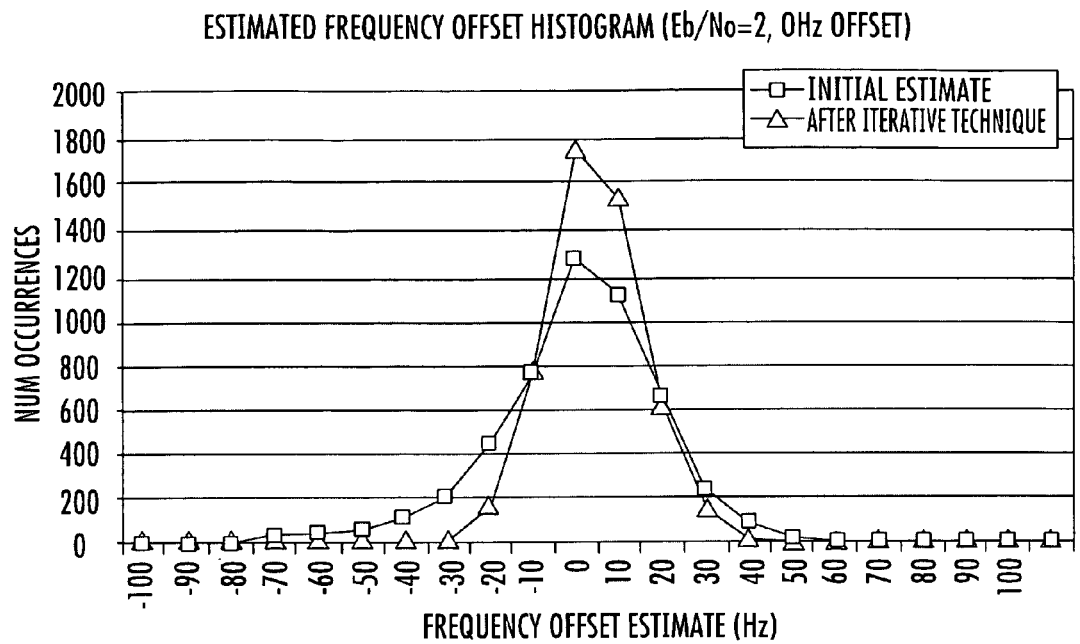
FIGS. 5-7 are graphs showing models of estimated frequency offset histograms for different signal-to-noise (Eb/No) ratios and frequency offsets in accordance with a non-limiting example of the present invention.
Figure 6:
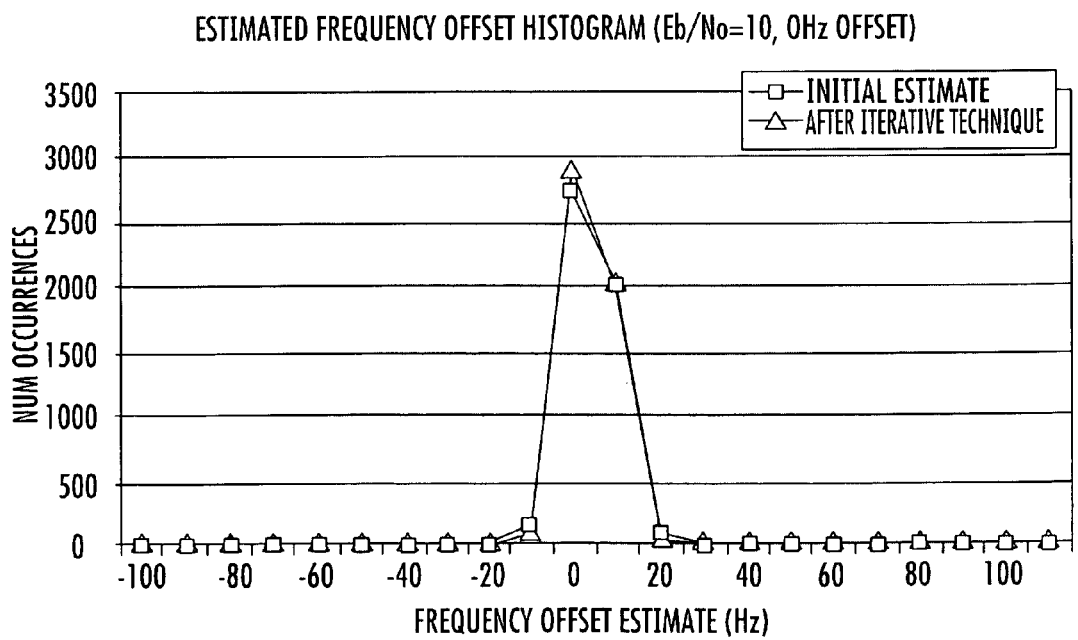
Figure 7:
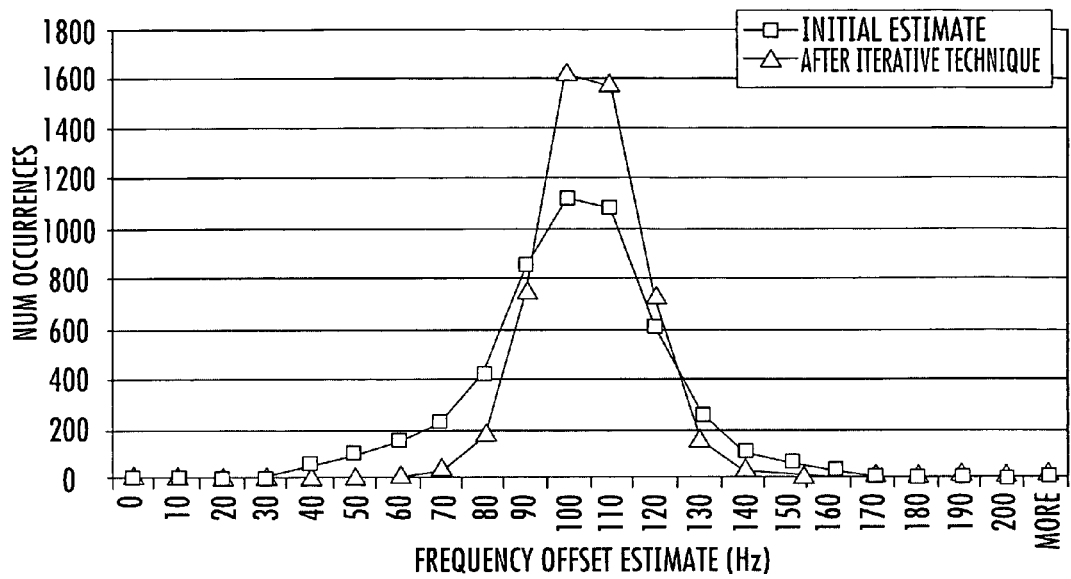

FIGS. 5-7 are graphs of models showing the estimated frequency offset histogram for different signal-to-noise ratios (Eb/No) and different frequency offsets in hertz (Hz) and comparing an initial estimate with the iterative technique in accordance with a non-limiting example of the present invention. The frequency offset is shown on the horizontal X axis and the number of occurrences are shown on the vertical Y axis.

FIG. 5 shows the frequency offset estimate relative to the number of occurrences when the Eb/No is 2 and no frequency offset is inserted into system.

FIG. 6 shows the estimated frequency offset histogram when the Eb/No is 10 and no frequency offset is inserted into system.

FIG. 7 shows the estimated frequency offset for a 100 Hz offset inserted into system when the Eb/No is 2.

When no offset is inserted, ideally only an impulse centered at zero would be observed. When an offset is inserted into system, impulse shifts to frequency offset value. Noise causes the FFT and the new technique to differ from the ideal impulse centered at 0 (for FIGS. 5 and 6) or 100 Hz (for FIG. 7). It is evident from these results that at low signal-to-noise ratios, the new technique reduces the frequency error computed by the FFT process.

Figure 8:
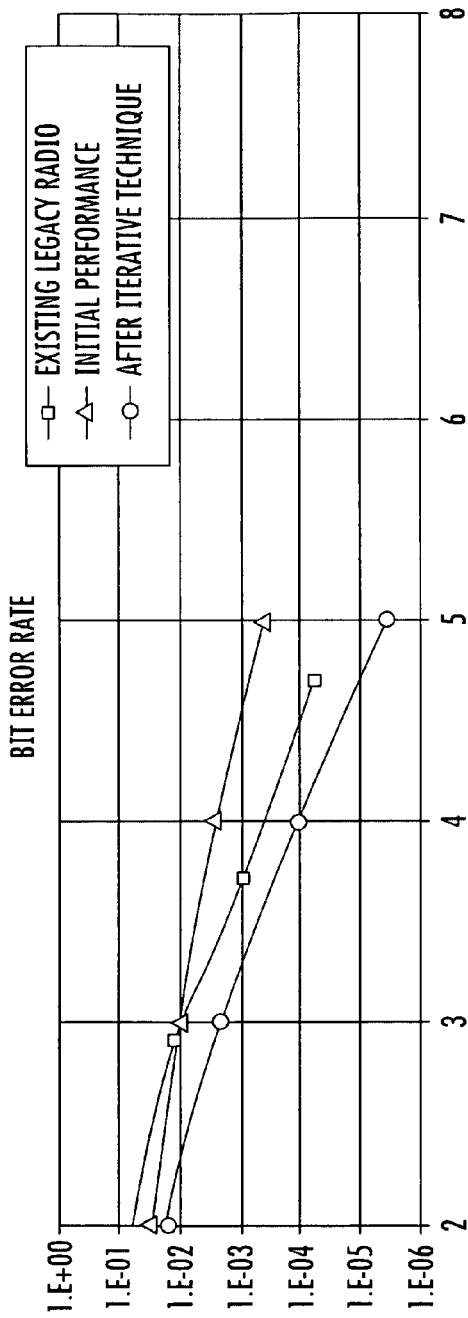
FIG. 8 is a graph showing a model of the bit error rate for different radios, including the radio using the iterative technique in accordance with a non-limiting example of the present invention and a legacy radio.

FIG. 8 shows the bit error rate (BER) performance for an existing legacy radio, the performance when only the FFT approach is used (labeled "Initial Performance") and the performance using a non-limiting example of the present invention (labeled "After Iterative Technique"). Clearly, a significant improvement is observed when present invention is used in receive processing.

Figure 9:
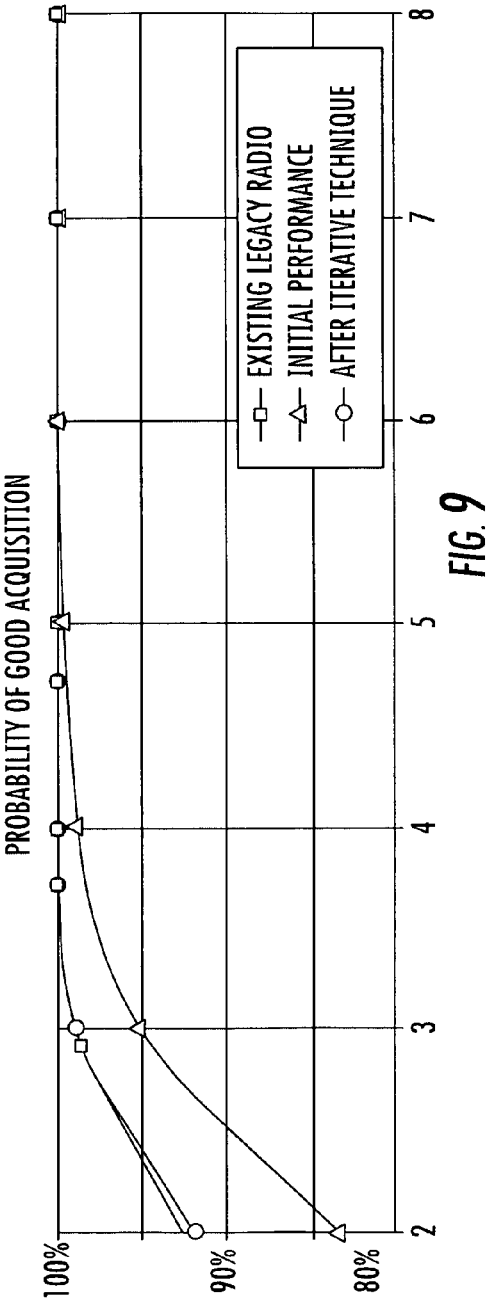
FIG. 9 is a graph showing a model of the probability of good acquisition for a radio using the iterative technique in accordance with a non-limiting example of the present invention as compared to an existing legacy radio.

FIG. 9 shows the probability of good acquisition for the same 3 systems of FIG. 8. Present invention performs as well as "Legacy Radio" while providing superior BER performance (FIG. 8).

Figure 10:
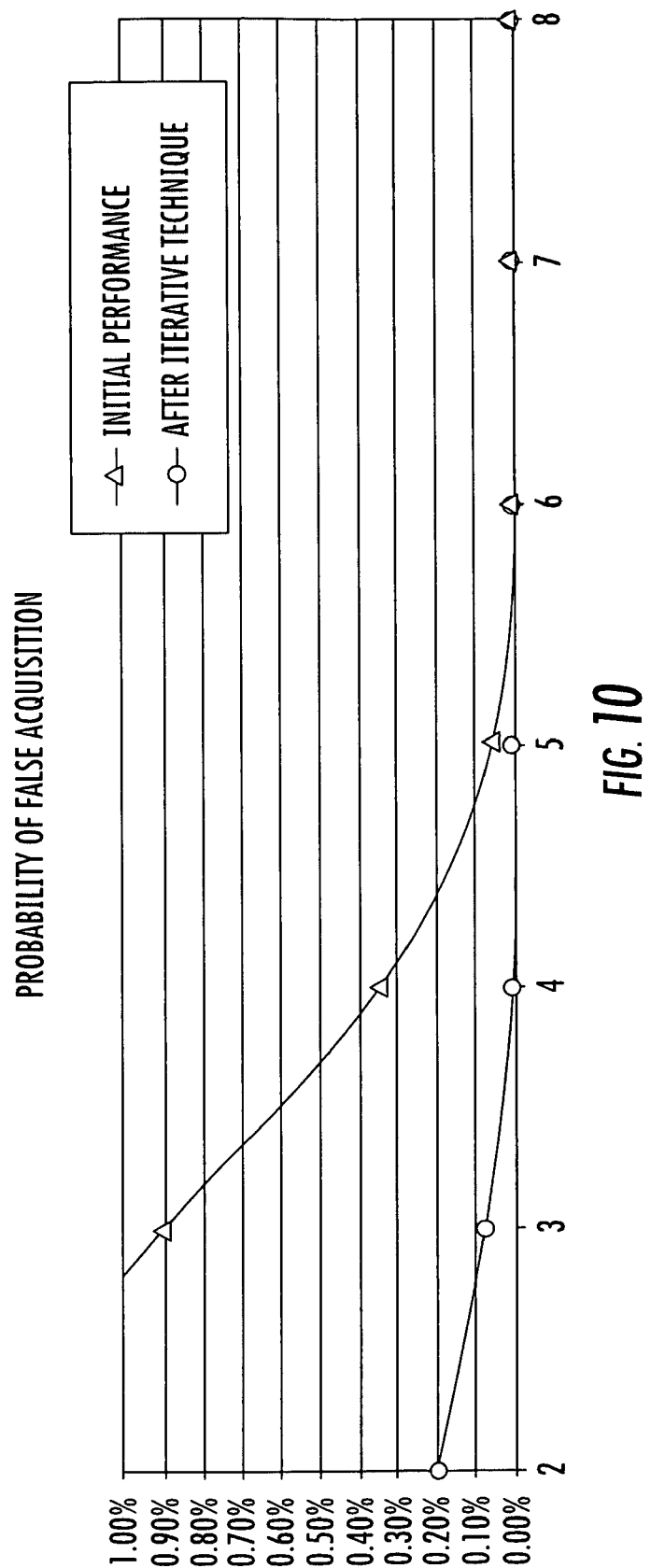
FIG. 10 is a graph showing a model of the probability of false acquisition and comparing legacy radios and an initial performance with a radio using the iterative technique using the system and method in accordance with a non-limiting example of the present invention.

FIG. 10 shows that the probability of a false acquisition for the iterative technique compared to the performance of initial system. Again, significant performance benefits from present invention can be observed.

For the case of BPSK, the communications device and modem provides for fast complex correlation processing when using the iterative technique as described because the reference patterns are purely real (i.e. the computational complexity of correlations is half of true complex correlations). Additionally, for all modulation types, computational complexity is reduced further by using only one training sequence alignment pattern in iterative process. It should be understood that not only does the modem use the 12 training sequence alignment pattern correlations to obtain good symbol timing, but also through further processing the modem and its iterative processing obtains the enhanced frequency and phase estimate. The iterative technique as described can be applied to any waveform (and modulation) that has a known repeated preamble. The first portion of the algorithm which is the first iteration of the iterative technique obtains a better alignment for the symbol timing. Then, a better frequency estimate and phase estimate are obtained as the iterative technique proceeds.

Figure 11:
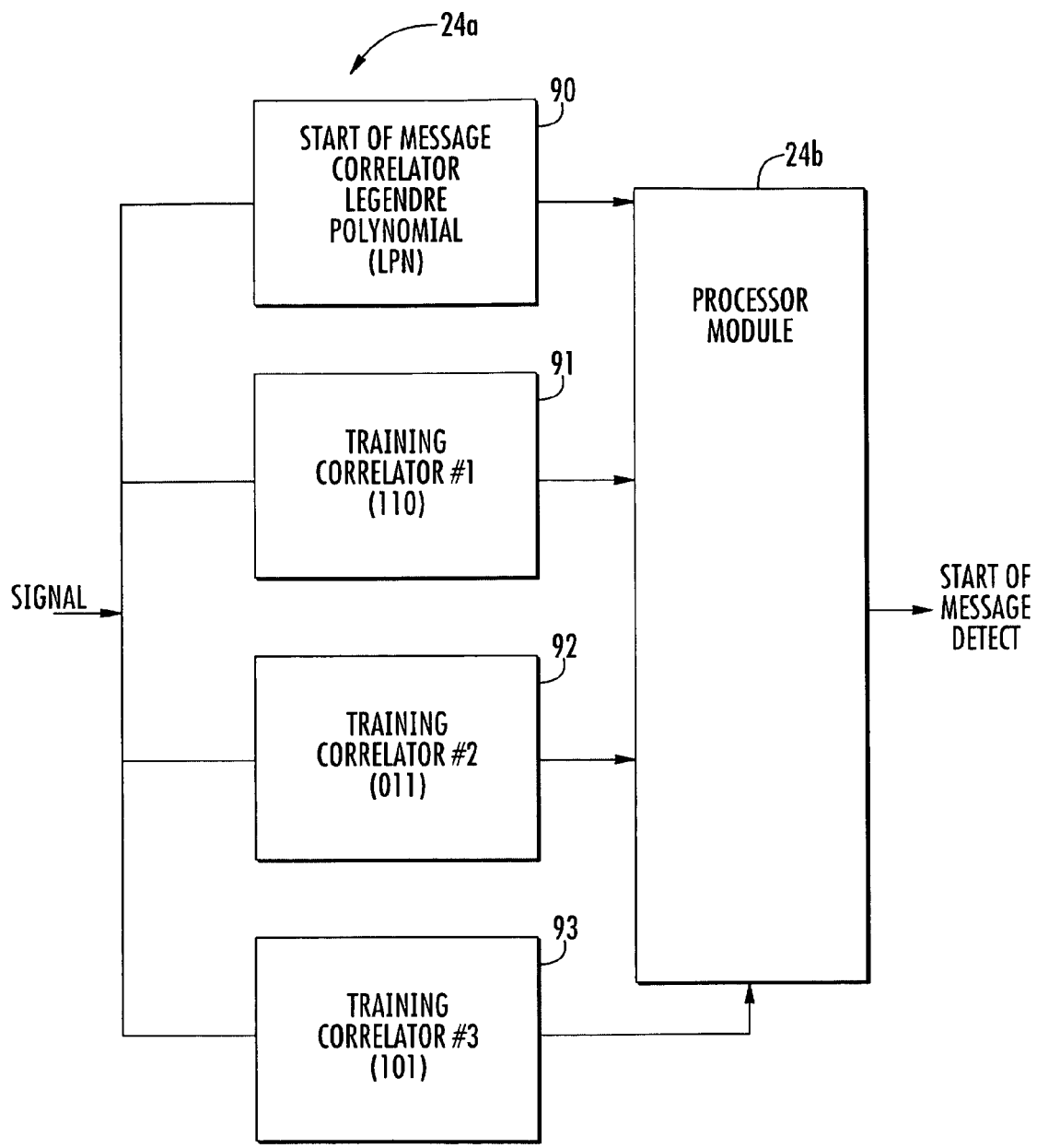
FIG. 11 is a block diagram showing a correlator with a number of different correlator modules for detecting a start of message sequence in accordance with a non-limiting example of the present invention.

Referring now to FIG. 11, the details of the correlator modules 24a shown in FIG. 1 are illustrated. For the example case of BPSK with a repeated training sequence of 011, four correlators are shown. The first correlator is as a start of message correlator 90 that is operative using a start of message bit sequence derived from a Legendre Polynomial (LPN). Three training correlators 91, 92, 93 are operative with the three different phases of the 011 sequence, e.g., the 110, 011, and 101 phase as illustrated. The processor module 24b shown in FIG. 1 is also operative with the correlators 90, 91, 92, 93. Note that one sample per symbol processing is used for this portion of modem processing, in a non-limiting example.

The correlators 90, 91, 92, 93 (i.e. quad correlators) together reduce the false detection of the start of message sequence. As noted before, the modem must acquire the waveform in each DAMA slot. Because of the non-random aspect of the preamble, the start of message bit correlation can sometimes false alarm during this non-random preamble portion of the waveform, i.e., 11010110110 (see FIG. 12). The quad correlator reduces the false detections in the 110110 . . . . portion of the preamble prior to the start of message bits as shown in FIG. 13.

As noted before, some legacy radios use the FFT to detect the waveform by exploiting the spectral characteristics of the transmitted preamble. After the FFT detects the preamble, the modem estimates the frequency offset, phase error and symbol timing. To detect the start of message, a start of message bit correlator is executed until the correlator output value exceeds a threshold. In these legacy radios, some operability is obtained with adequate results, but better results could be obtained.

The start of message false detect technique, in accordance with a non-limiting example of the present invention, acquires the waveform preamble and the frequency offset, phase error and symbol timing are computed as noted before. The four correlators are started. The first correlator as the start of message correlator searches for the start of message bits. The other three correlators correlate for the three different phases of the 110 pattern. The start of message correlator output 90 must be larger than any one of the three correlators 91, 92, 93 looking for the different phases of the 110 pattern. The processor module 24b provides a new state machine for acquisition with the correlators. It should be understood that the processor module of the modem can incorporate the different correlators as part of a digital signal processor or field programmable gate array or other processing modules or circuitry. The processor module takes the results from the correlator and processes them for the start of message detect. It should be understood that the start of message should be greater than the start of message threshold and all three correlators should have less than a start of message threshold to correspond to a good acquisition. Thus, the correlator module 24a avoids falsing during the non-random portion of a preamble when searching for the start of message bits.

It should be understood that the correlator modules are advantageous because the 011 or similar pattern often is a poor pattern from a correlation properties perspective and this pattern makes it difficult to correlate for the start of message, especially if noise is involved. The quad correlator allows a more reliable detection of the start of message because the three different phases of the 011 are looked for within the correlators. In the first portion of the technique described relative to FIGS. 1-10, the four samples for every symbol are processed. In a non-limiting example of the present invention, the start of message false detect technique described by FIG. 11 shows modem processing performed on a one sample per symbol basis with four different correlators running: the start of message correlator and the three phases of the 011 pattern.

The first correlator as the start of message correlator 90 uses bits obtained from a Legendre Polynomial (LPN). Note that this bit pattern can be found in the US MIL-STD-188-181B specification.

Figure 12:
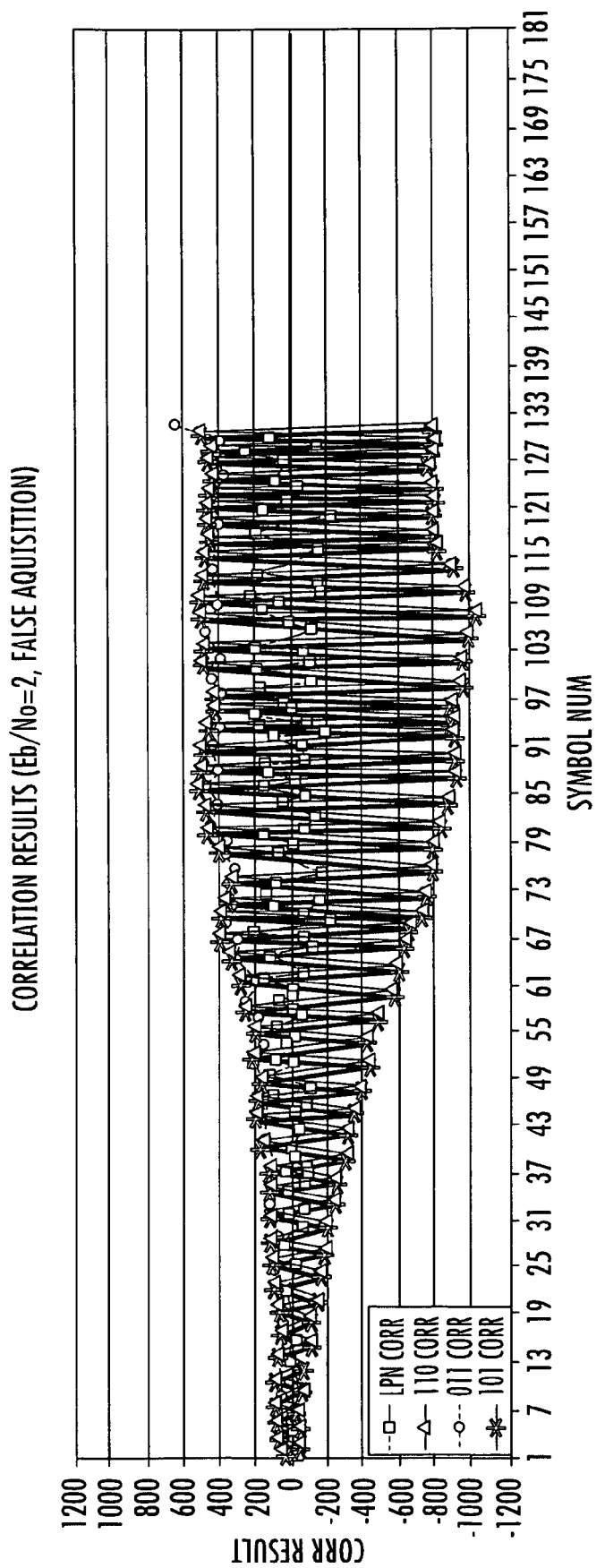
FIG. 12 is a graph showing a model of the correlation results during a false acquisition using four correlators.
Figure 13:
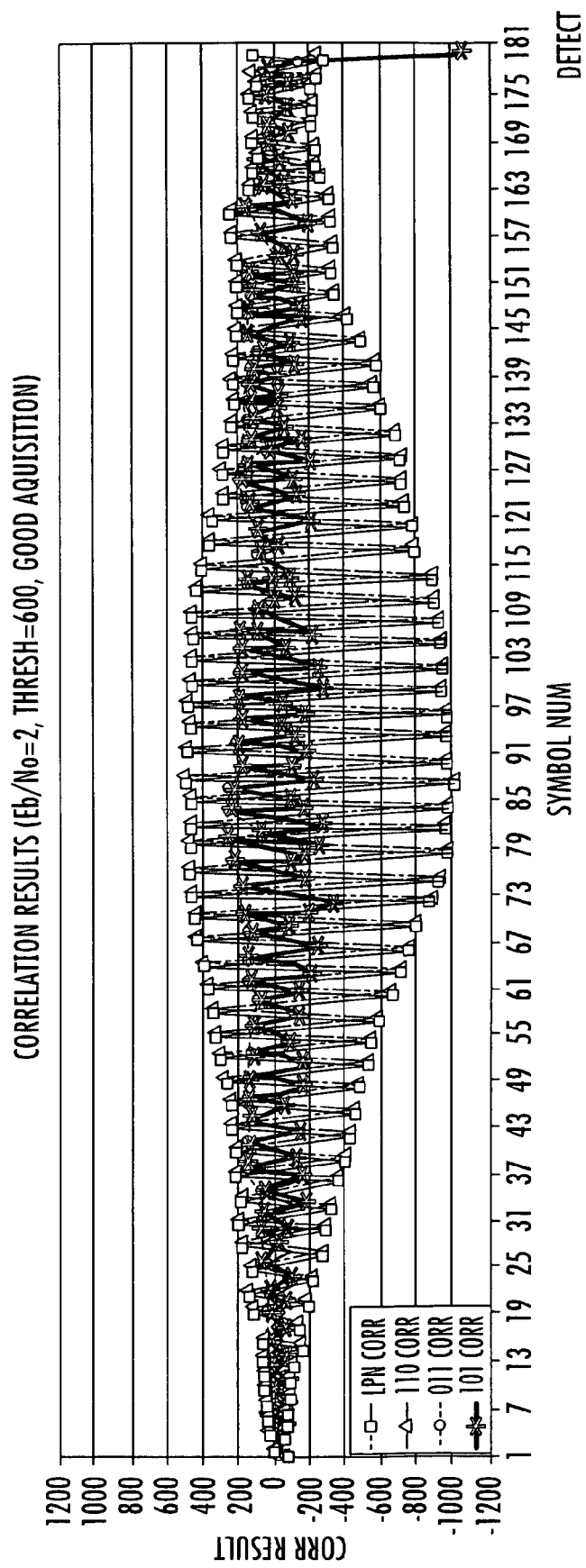
FIG. 13 is a graph showing a model of the correlation results for the four correlators in a good acquisition in accordance with a non-limiting example of the present invention.

FIGS. 12 and 13 show respective models for the correlation results with a false acquisition shown in FIG. 12 and a good acquisition shown in FIG. 13. The signal-to-noise ratio is 2 dB in each graph with the symbol number shown on the horizontal X axis and the correlation result shown on the vertical Y axis. The four correlation results for the LPN as the start of message correlator is shown with the three correlators as training correlators for the 110, 011 and 101 correlator. The threshold of 600 is used in the model of FIG. 13.

As shown in FIG. 12, the SOM correlator has a false peak during the training sequence. Modem processing that only correlates for the SOM sequence would have falsely detected the SOM pattern and output erroneous data for that DAMA slot.

In the graph shown in FIG. 13, there is a good acquisition with the three training correlators coming up and ramping back down again. The peak occurs at the end after the three correlators slide into the start of message bit pattern. The phase can be irrelevant at the end and a positive or negative peak can occur.

For purposes of description, some background information on coding, interleaving, and an exemplary wireless, mobile radio communications system that includes ad-hoc capability and can be modified for use is set forth. This example of a communications system that can be used and modified for use with the present invention is now set forth with regard to FIGS. 14 and 15.

An example of a radio that could be used with such system and method is a Falcon™ III radio manufactured and sold by Harris Corporation of Melbourne, Fla. This type of radio can support carrier frequencies form 30 MHz up to 2 GHz, including L-band SATCOM and MANET. The waveforms can provide secure IP data networking. It should be understood that different radios can be used, including software defined radios that can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the software communications architecture (SCA) specification (see www.jtrs.saalt.mil), which is hereby incorporated by reference in its entirety. The SCA is an open architecture framework that specifies how hardware and software components are to interoperate so that different manufacturers and developers can readily integrate the respective components into a single device.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

Figure 14:
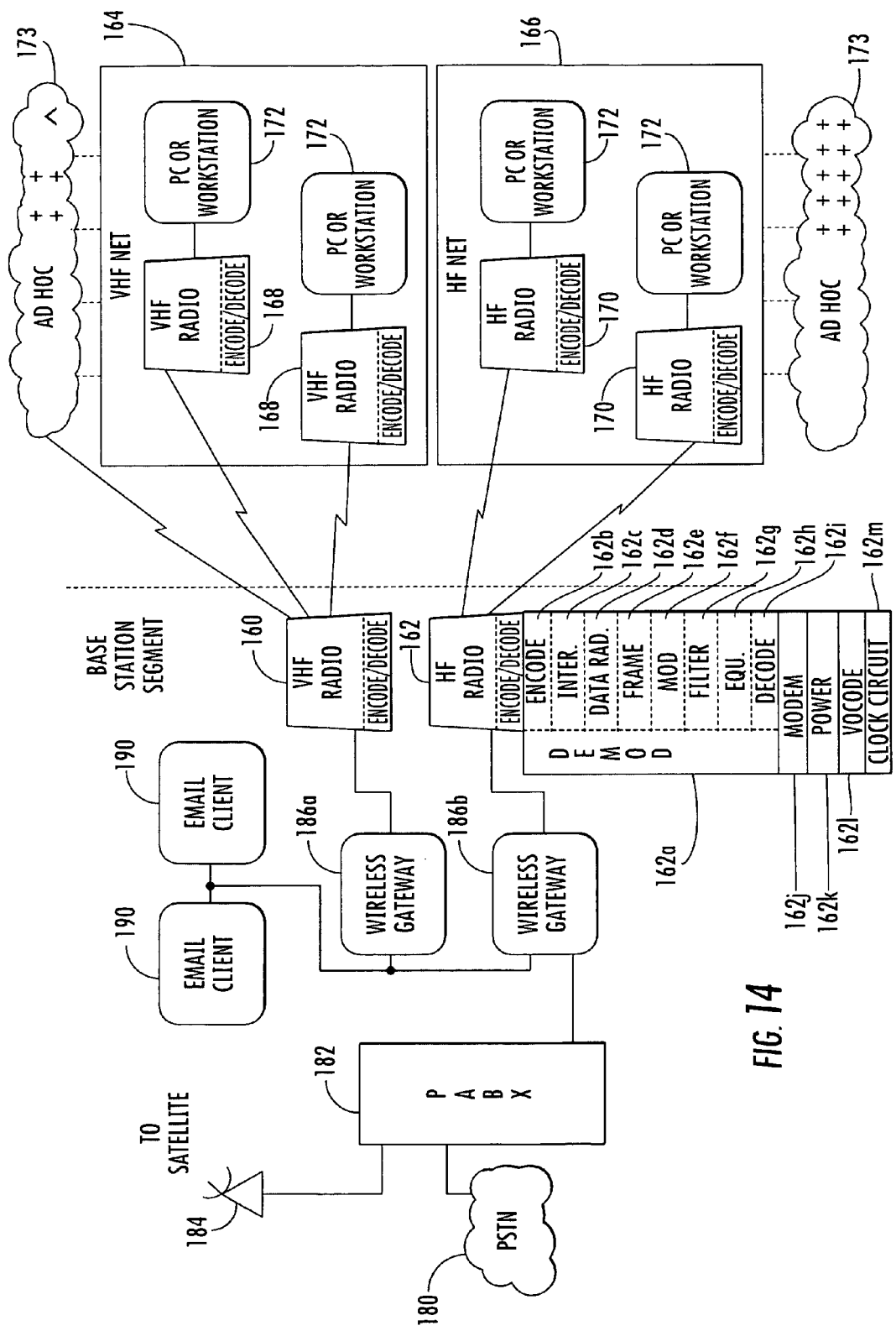
FIG. 14 is a block diagram of an example of a communications system that can be used in accordance with a non-limiting example of the present invention.
Figure 15:
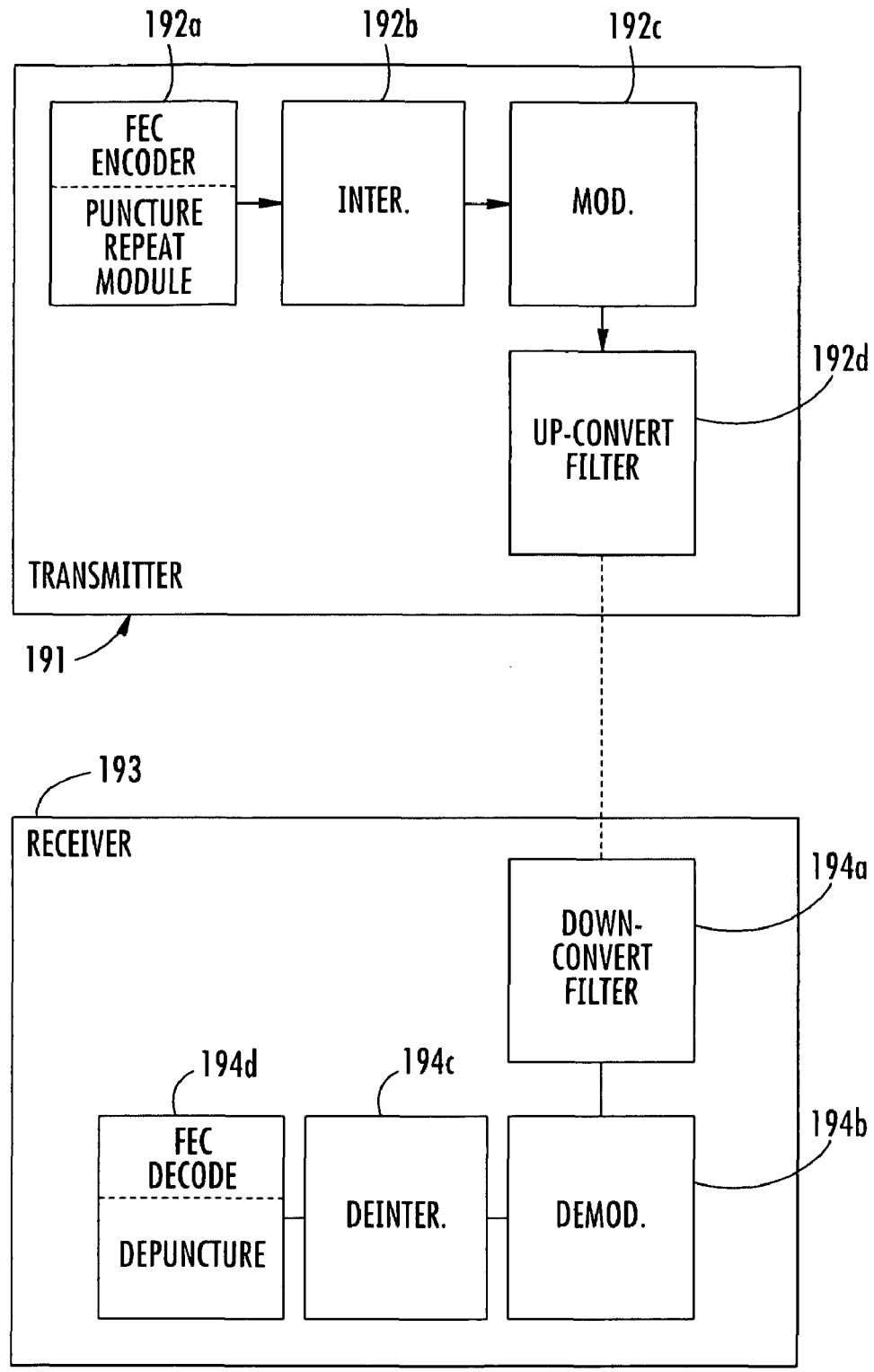
FIG. 15 is a high-level block diagram showing basic components that can be used in accordance with a non-limiting example of the present invention.

For purposes of description only, a brief description of an example of a communications system that includes communications devices that incorporate the filter in accordance with a non-limiting example, is described relative to a non-limiting example shown in FIG. 14. This high-level block diagram of a communications system includes a base station segment and wireless message terminals that could be modified for use with the present invention. The base station segment includes a VHF radio 160 and HF radio 162 that communicate and transmit voice or data over a wireless link to a VHF net 164 or HF net 166, each which include a number of respective VHF radios 168 and HF radios 170, and personal computer workstations 172 connected to the radios 168,170. Ad-hoc communication networks 173 are interoperative with the various components as illustrated. The entire network can be ad-hoc and include source, destination and neighboring mobile nodes. Thus, it should be understood that the HF or VHF networks include HF and VHF net segments that are infrastructureless and operative as the ad-hoc communications network. Although UHF and higher frequency radios and net segments are not illustrated, these could be included.

The radio can include a demodulator circuit 162*a* and appropriate convolutional encoder circuit 162*b*, block interleaver 162*c*, data randomizer circuit 162*d*, data and framing circuit 162*e*, modulation circuit 162*f*, matched filter circuit 162*g*, block or symbol equalizer circuit 162*h* with an appropriate clamping device, deinterleaver and decoder circuit 162*i* modem 162*j*, and power adaptation circuit 162*k* as non-limiting examples. A vocoder circuit 162*l* can incorporate the decode and encode functions and a conversion unit could be a combination of the various circuits as described or a separate circuit. A clock circuit 162*m* can establish the physical clock time and through second order calculations as described below, a virtual clock time. The network can have an overall network clock time. These and other circuits operate to perform any functions necessary for the present invention, as well as other functions suggested by those skilled in the art. Other illustrated radios, including all VHF (or UHF) and higher frequency mobile radios and transmitting and receiving stations can have similar functional circuits. Radios could range from 30 MHz to about 2 GHz as non-limiting examples.

The base station segment includes a landline connection to a public switched telephone network (PSTN) 180, which connects to a PABX 182. A satellite interface 184, such as a satellite ground station, connects to the PABX 182, which connects to processors forming wireless gateways 186*a*, 186*b*. These interconnect to the VHF radio 160 or HF radio 162, respectively. The processors are connected through a local area network to the PABX 182 and e-mail clients 190. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance radio at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

A communications system that incorporates communications devices can be used in accordance with non-limiting examples of the present invention and is shown in FIG. 14. A transmitter is shown at 191 and includes basic functional circuit components or modules, including a forward error correction encoder 192a that includes a puncturing module, which could be integral to the encoder or a separate module. The decoder 192a and its puncturing module includes a function for repeating as will be explained below. Encoded data is interleaved at an interleaver 192b, for example, a block interleaver, and in many cases modulated at modulator 192c. This modulator can map the communications data into different symbols based on a specific mapping algorithm to form a communications signal. For example, it could form Minimum Shift Keying or Gaussian Minimum Shift Keying (MSK or GMSK) symbols. Other types of modulation could be used in accordance with non-limiting examples of the present invention. Up-conversion and filtering occurs at an up-converter and filter 192d, which could be formed as an integrated module or separate modules. Communications signals are transmitted, for example, wirelessly to receiver 193.

At the receiver 193, down conversion and filtering occurs at a down converter and filter 194a, which could be integrated or separate modules. The signal is demodulated at demodulator 194b and deinterleaved at deinterleaver 194c. The deinterleaved data (i.e. bit soft decisions) is decoded and depunctured (for punctured codes), combined (for repeated codes) and passed through (for standard codes) at decoder 194d, which could include a separate or integrated depuncturing module. The system, apparatus and method can use different modules and different functions. These components as described could typically be contained within one transceiver.

It should be understood, in one non-limiting aspect of the present invention, a rate 1/2, K=7 convolutional code can be used as an industry standard code for forward error correction (FEC) during encoding. For purposes of understanding, a more detailed description of basic components now follows. A convolutional code is an error-correcting code, and usually has three parameters (n, k, m) with n equal to the number of output bits, k equal to the number of input bits, and m equal to the number of memory registers, in one non-limiting example. The quantity k/n could be called the code rate with this definition and is a measure of the efficiency of the code. K and n parameters can range from 1 to 8, m can range from 2 to 10, and the code rate can range from 1/8 to 7/8 in non-limiting examples. Sometimes convolutional code chips are specified by parameters (n, k, L) with L equal to the constraint length of the code as L=k (m−1). Thus, the constraint length can represent the number of bits in an encoder memory that would affect the generation of n output bits. Sometimes the letters may be switched depending on the definitions used.

The transformation of the encoded data is a function of the information symbols and the constraint length of the code. Single bit input codes can produce punctured codes that give different code rates. For example, when a rate 1/2 code is used, the transmission of a subset of the output bits of the encoder can convert the rate 1/2 code into a rate 2/3 code. Thus, one hardware circuit or module can produce codes of different rates. Punctured codes allow rates to be changed dynamically through software or hardware depending on channel conditions, such as rain or other channel impairing conditions.

An encoder for a convolutional code typically uses a look-up table for encoding, which usually includes an input bit as well as a number of previous input bits (known as the state of the encoder), the table value being the output bit or bits of the encoder. It is possible to view the encoder function as a state diagram, a tree diagram or a trellis diagram.

Decoding systems for convolutional codes can use 1) sequential decoding, or 2) maximum likelihood decoding, also referred to as Viterbi decoding, which typically is more desirable. Sequential decoding allows both forward and backward movement through the trellis. Viterbi decoding as maximum likelihood decoding examines a receive sequence of given length, computes a metric for each path, and makes a decision based on the metric.

Puncturing convolutional codes is a common practice in some systems and is used in accordance with non-limiting examples of the present invention. It should be understood that in some examples a punctured convolutional code is a higher rate code obtained by the periodic elimination of specific code bits from the output of a low rate encoder. Punctured convolutional code performance can be degraded compared with original codes, but typically the coding rate increases.

Some of the basic components that could be used as non-limiting examples of the present invention include a transmitter that incorporates a convolutional encoder, which encodes a sequence of binary input vectors to produce the sequence of binary output vectors and can be defined using a trellis structure. An interleaver, for example, a block interleaver, can permute the bits of the output vectors. The interleaved data would also be modulated at the transmitter (by mapping to transmit symbols) and transmitted. At a receiver, a demodulator demodulates the signal.

A block deinterleaver recovers the bits that were interleaved. A Viterbi decoder could decode the deinterleaved bit soft decisions to produce binary output data.

Often a Viterbi forward error correction module or core is used that would include a convolutional encoder and Viterbi decoder as part of a radio transceiver as described above. For example if the constraint length of the convolutional code is 7, the encoder and Viterbi decoder could support selectable code rates of 1/2, 2/3, 3/4, 4/5, 5/6, 6/7, 7/8 using industry standard puncturing algorithms.

Different design and block systems parameters could include the constraint length as a number of input bits over which the convolutional code is computed, and a convolutional code rate as the ratio of the input to output bits for the convolutional encoder. The puncturing rate could include a ratio of input to output bits for the convolutional encoder using the puncturing process, for example, derived from a rate 1/2 code.

The Viterbi decoder parameters could include the convolutional code rate as a ratio of input to output bits for the convolutional encoder. The puncture rate could be the ratio of input to output bits for the convolutional encoder using a puncturing process and can be derived from a rate 1/2 mother code. The input bits could be the number of processing bits for the decoder. The Viterbi input width could be the width of input data (i.e. soft decisions) to the Viterbi decoder. A metric register length could be the width of registers storing the metrics. A trace back depth could be the length of path required by the Viterbi decoder to compute the most likely decoded bit value. The size of the memory storing the path metrics information for the decoding process could be the memory size. In some instances, a Viterbi decoder could include a First-In/First-Out (FIFO) buffer between depuncture and Viterbi function blocks or modules. The Viterbi output width could be the width of input data to the Viterbi decoder.

The encoder could include a puncturing block circuit or module as noted above. Usually a convolutional encoder may have a constraint length of 7 and take the form of a shift register with a number of elements, for example, 6. One bit can be input for each clock cycle, Thus, the output bits could be defined by a combination of shift register elements using a standard generator code and be concatenated to form an encoded output sequence. There could be a serial or parallel byte data interface at the input. The output width could be programmable depending on the punctured code rate of the application.

A Viterbi decoder in non-limiting examples could divide the input data stream into blocks, and estimate the most likely data sequence. Each decoded data sequence could be output in a burst. The input and calculations can be continuous and require four clock cycles for every two bits of data in one non-limiting example. An input FIFO can be dependent on a depuncture input data rate.

It should also be understood that the present invention is not limited to convolutional codes and similar FEC, but also turbo codes could be used as high-performance error correction codes or low-density parity-check codes that approach the Shannon limit as the theoretical limit of maximum information transfer rate over a noisy channel. Thus, some available bandwidth can be increased without increasing the power of the transmission. Instead of producing binary digits from the signal, the front-end of the decoder could be designed to produce a likelihood measure for each bit.

The system and extended preamble, in accordance with non-limiting examples of the present invention, can be used in multiprocessor embedded systems and related methods and also used for any type of radio software communications architecture as used on mainframe computers or small computers, including laptops with an added transceiver, such as used by military and civilian applications, or in a portable wireless communications device. The portable wireless communications device can include a transceiver as an internal component and handheld housing with an antenna and control knobs. A Liquid Crystal Display (LCD) or similar display can be positioned on the housing in an appropriate location for display. The various internal components, including dual processor systems for red and black subsystems and software that is conforming with SCA, can be operative with the radio. The architecture as described can be used with any processor system operative with the transceiver in accordance with non-limiting examples of the present invention. An example of a communications device that could incorporate the system and method, in accordance with non-limiting examples of the present invention, is the Falcon® III manpack or tactical radio platform manufactured by Harris Corporation of Melbourne, Fla.

This application is related to copending patent applications entitled, "COMMUNICATIONS DEVICE AND RELATED METHOD WITH IMPROVED ACQUISITION ESTIMATES OF FREQUENCY OFFSET AND PHASE ERROR," and "COMMUNICATIONS DEVICE AND RELATED METHOD THAT DETECTS SYMBOL TIMING," which are filed on the same date and by the same assignee and inventors, the disclosures which are hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method of processing a communications signal, comprising:
   receiving within a modem a repeated preamble bit or symbol pattern for a digitally modulated communications signal;
   generating an initial frequency offset estimate and phase error estimate by detecting the repeated preamble pattern for a block of samples within the communications signal;
   correlating within a Start of Message correlator to search for Start of Message bits;
   correlating different phases of the repeated preamble pattern within training correlators;
   calculating a frequency offset adjustment;
   updating the frequency offset estimate with the frequency offset adjustment and a symbol timing alignment derived from correlating two halves of the block of samples; and
   repeating iteratively with a complex correlation an "N" number of times to obtain a final updated frequency estimate that provides a maximum correlated output value as final correlator values for a phase error estimate to reduce false detections of the Start of Message sequence.

2. The method according to claim 1, which further comprises correlating within N training correlators.

3. The method according to claim 2, which further comprises correlating for N different phases of a repeated M bit or symbol pattern.

4. The method according to claim 1, which further comprises determining a good acquisition has occurred when the output from the Start of Message correlator is larger than any of the training correlators and above a desired correlation threshold.

5. The method according to claim 1, which further comprises a start of message correlator based on a bit pattern generated via a Legendre Polynomial.

6. The method according to claim 1, which further comprises correlating two halves of the block of samples with a plurality of different shifted sequences and determining a timing alignment based on the shifted sequence that provides the maximum correlation output value.

7. The method according to claim 1, which further comprises rotating the block of samples by the negative of the initial frequency offset estimate.

8. The method according to claim 1, wherein the initial signal detection spans 256 samples containing symbols sampled at 4 samples per symbol.

9. A method of processing a communications signal, comprising:
- receiving within a modem a repeated preamble bit or symbol pattern as a training sequence for a binary phase shift keyed (BPSK) communications signal;
- generating an initial frequency offset estimate and phase error estimate by processing a Fast Fourier Transform (FFT) that spans a block of samples for the BPSK communications signal and detects the repeated preamble pattern for the block of samples within the communications signal,
- correlating for the Start of Message sequence and for different phases of the repeated preamble pattern within training correlators to determine when a good Start of Message acquisition has occurred;
- calculating a frequency offset adjustment;
- updating the frequency offset estimate with the frequency offset adjustment and a symbol timing alignment derived from correlating two halves of the block of samples; and
- repeating iteratively with a complex correlation an "N" number of times to obtain a final updated frequency estimate that provides a maximum correlated output value as final correlator values for a phase error estimate to reduce false detections of the start of message sequence.

10. The method according to claim 9, which further comprises correlating within a Start of Message correlator to search for the Start of Message sequence.

11. The method according to claim 9, which further comprises correlating different phases of the repeated preamble pattern within training correlators for reducing false detections of the Start of Message.

12. The method according to claim 9, which further comprises correlating for different phases of a repeated pattern.

13. The method according to claim 9, which further comprises determining a good acquisition has occurred when the output from the Start of Message correlator is larger than any of the training correlators and above a desired correlation threshold.

14. The method according to claim 9, which further comprises correlating using bits generated from a Legendre Polynomial.

15. The method according to claim 9, wherein the FFT spans 256 samples containing 64 BPSK symbols sampled at 4 samples per symbol.

16. The method according to claim 9, which further comprises calculating the magnitude-squared of the sum of the two halves of the correlator outputs for the plurality of shifted sequences to obtain a timing alignment.

17. The method according to claim 9, and further comprising transmitting a start of message sequence after the repeated preamble pattern.

18. The method according to claim 9, and further comprising transmitting a three bit or symbol pattern as the repeated preamble pattern.

19. The method according to claim 9, which further comprises correlating the two halves with 12 different BPSK shifted sequences.

20. A communications device, comprising:
- a signal input for receiving a binary phase shift keyed (BPSK) communications signal having a repeated preamble bit or symbol pattern;
- a modem that processes the BPSK communications signal and further comprising a demodulator and processor that generates an initial frequency offset estimate and phase error estimate by detecting the repeated preamble pattern for a block of samples within the communications signal, correlates within a Start of Message correlator to search for the Start of Message sequence and correlates different phases of the repeated preamble pattern within training correlators to reduce false detections of the Start of Message;
- wherein said modem is configured to calculate a frequency offset adjustment;
- update the frequency offset estimate with the frequency offset adjustment and a symbol timing alignment derived from correlating two halves of the block of samples;
- repeat iteratively with a complex correlation an "N" number of times to obtain a final updated frequency estimate that provides a maximum correlated output value as final correlator values for a phase error estimate; and
- radio circuitry operative with the modem for processing communications data obtained from the communications signal.

21. The communications device according to claim 20, wherein said modem is operative for correlating within three training correlators.

22. The communications device according to claim 20, wherein said modem is operative for correlating for three different phases of a three bit or symbol pattern.

23. The communications device according to claim 20, wherein said modem is operative for determining a good acquisition has occurred when the output from the Start of Message correlator is larger than any of the training correlators and above a desired correlation threshold.

24. The communications device according to claim 20, wherein the initial detection circuit spans 256 samples containing 64 BPSK symbols sampled at 4 samples per symbol.

* * * * *